May 2, 1961 K. MEYER ET AL 2,982,533
SINTERING PROCESS AND APPARATUS
Filed Dec. 30, 1957 3 Sheets-Sheet 1

Inventors.
KURT MEYER, OSWALD JENNE, JAKOB SCHWALB
KARL MICHEL, WALTER STIEGER, FRIEDRICH UENG
BY Bailey, Stephens + Huettig
ATTORNEYS.

May 2, 1961 K. MEYER ET AL 2,982,533
SINTERING PROCESS AND APPARATUS
Filed Dec. 30, 1957 3 Sheets-Sheet 2
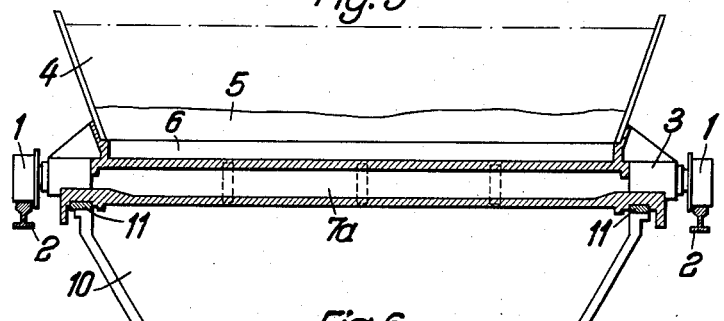
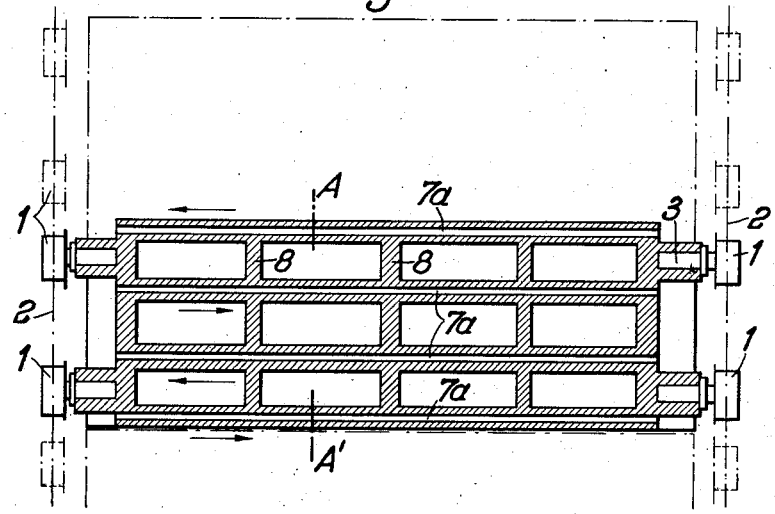
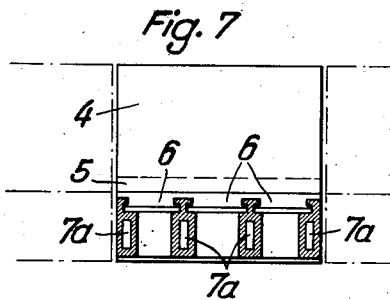 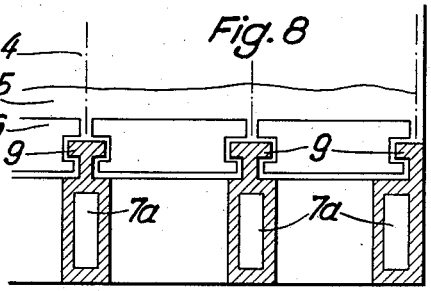
Inventors
KURT MEYER, OSWALD JENNE, JAKOB SCHWALB,
KARL MICHEL, WALTER STIEGER, FRIEDRICH WENG
BY Bailey, Stephens + Huettig
ATTORNEYS.

May 2, 1961 K. MEYER ET AL 2,982,533
SINTERING PROCESS AND APPARATUS
Filed Dec. 30, 1957 3 Sheets-Sheet 3
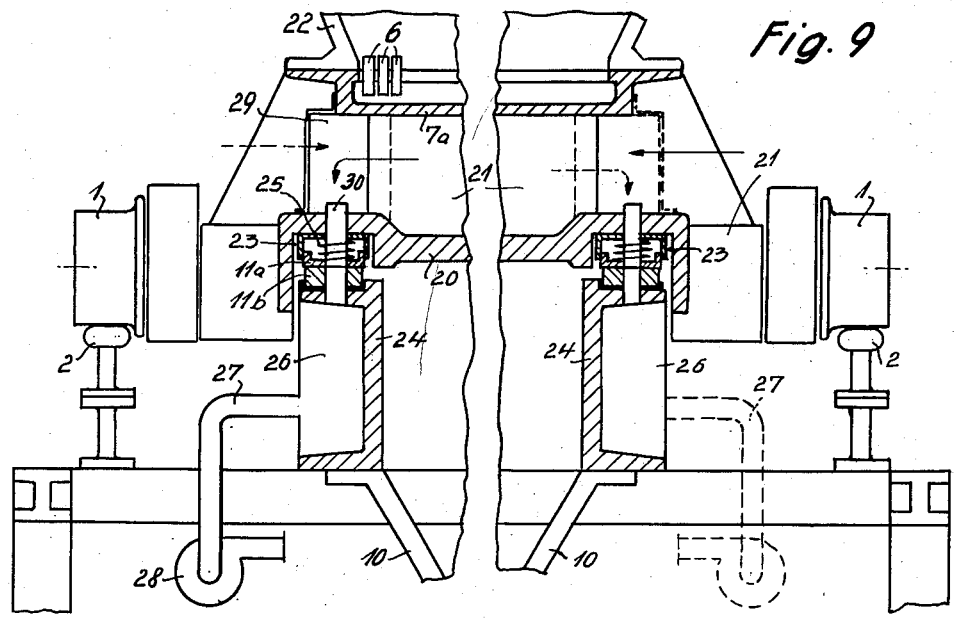
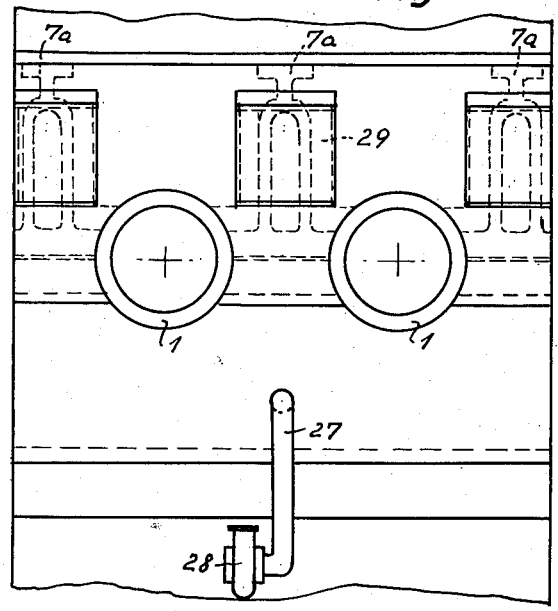
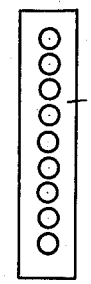 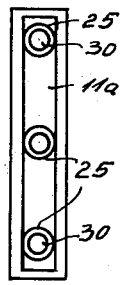
INVENTORS.
KURT MEYER, OSWALD JENNE, JAKOB SCHWALB,
KARL MICHEL, WALTER STIEGER, FRIEDRICH WENG
BY Bailey, Stephens + Huettig
ATTORNEYS.

United States Patent Office 2,982,533
Patented May 2, 1961

2,982,533
SINTERING PROCESS AND APPARATUS

Kurt Meyer, Oswald Jenne, and Jakob Schwalb, Frankfurt am Main, Karl Michel, Bruchenbrucken, Walter Stieger, Frankfurt am Main, and Friedrich Weng, Zeidenhofen, Kreis Marburg, Germany, assignors to Metallgesellschaft Aktiengesellschaft, Frankfurt am Main, Germany Filed Dec. 30, 1957, Ser. No. 706,197

Claims priority, application Germany Jan. 8, 1957

3 Claims. (Cl. 266—21)

This invention relates to a process and apparatus for sintering materials. In particular, the invention is directed to the hard burning of pellets.

Fine grained ores, such as iron ores, are formed into pellets on granulating discs or drums, and then the pellets are hard burned in a sintering apparatus. Heretofore the sintering apparatus used for hard burning is the same apparatus used for the sintering of unpelletized fine grained materials.

During the sintering of unpelletized fine grained materials in such apparatus, the grate does not become heated to more than from 400° to 500° C. in spite of the fact that the interior of the bed of material being sintered reaches temperatures which can exceed 1600° C. This is because a cooling zone exists immediately adjacent to the burning zone in the apparatus so that the hottest gases passing out of the bed give up the greater part of their heat to a layer of inert material on the grate before the gases are able to heat the grate itself.

It has been found that during the use of sintering grates for the hard burning of pellets, especially pellets composed of iron oxide ores, the grate is exposed to much higher temperatures when pellets of adequate quality, size, hardness, and sufficiently oxidized are obtained. The purchasers of sintered pellets place considerable value on pellets having a diameter of at least 12 mm. and preferably 24 mm. In sintering pellets of such sizes, the sintering bed is much more gas permeable than beds composed of fine material and thus heat is transferred from the burning bed very quickly to the grate. Also, the large pellets must be exposed to burning for much more longer periods at high temperatures than the fine materials and so the grate is correspondingly exposed to such higher temperatures over a longer period. Finally, it is advantageous to burn the pellets exclusively by the use of gas heating, the high heat transfer to the grate being correspondingly increased. It has been found that during the hard burning of the pellets, the grate is exposed to temperatures far above 400° to 500° C. and at temperatures at which metallic materials will readily lose the major part of their strength so that the grate bars warp and cause operating troubles. The temperature at which the grate must be heated during continuous operation and at least for certain periods in order to produce a satisfactory hard burning of the pellets is usually about 800° C. and over.

The object of this invention is to produce a process and apparatus for cooling the grates of a sintering apparatus in which the grates are moved along the apparatus during the sintering operation.

It would be expected that the cooling of movable grates by means of air passed through hollow grate bars would be economically impracticable. The production of a satisfactory connection to the hollow bars for the cooling air would require that the grate bars be rigidly connected with the grate carriage. However, for practical reasons, the grate bars are loosely supported in the grate carriage in order to permit the cleaning of the grate of clogged and sticky materials and also to permit a quick replacement of the bars. Furthermore, the grate bars of a sintering apparatus should not exceed a certain maximum diameter, and it is difficult to use a bar having a small diameter with a large enough air channel therethrough to give a good cooling effect.

It has been found that the above disadvantages are avoided if the grate is composed of uncooled narrow grate bars of suitably high heat resistant metal. These bars are mounted upon the transverse members of a grate carriage with these members being hollow and interiorly cooled by air. It is not necessary to provide means for providing cooling air to the members during the entire passage of the grate carriage through the sintering apparatus. It suffices to cool the grate carriages at their position in which they are exposed to particularly high temperatures during their passage through the apparatus. The air connection to the members is accomplished in a simple manner by means of a sliding connection with the members and suitable seals.

The means by which the objects of the invention are obtained are disclosed more fully with reference to the accompanying drawings, in which:

Figure 5 is a cross-sectional view similar to Figure 1 showing the construction of this invention;

Figure 6 is a plan view of a portion of Figure 5;

Figure 7 is a cross-sectional view on the line A—A' of Figure 6;

Figure 8 is an enlarged view of a portion of Figure 7;

Figure 9 is a cross-sectional view of the air-cooled pallet of this invention;

Figure 10 is a side view of the pallet shown in Figure 9;

Figure 11 is a plan view of one of the slide bars shown in Figure 9; and

Figure 12 is a plan view of the other slide bar shown in Figure 9.

Figure 1:
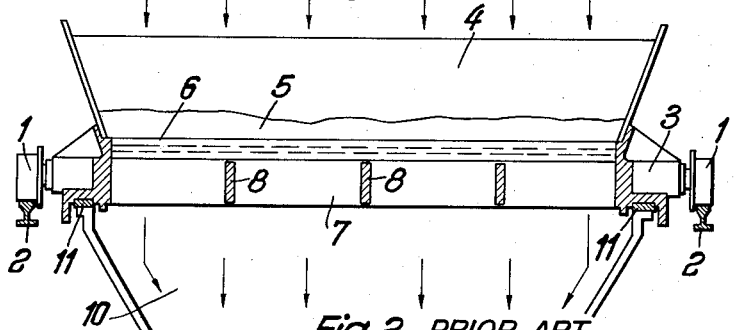
Figure 1 is a cross-sectional view through a grate movably mounted on a sintering apparatus.
Figure 2:
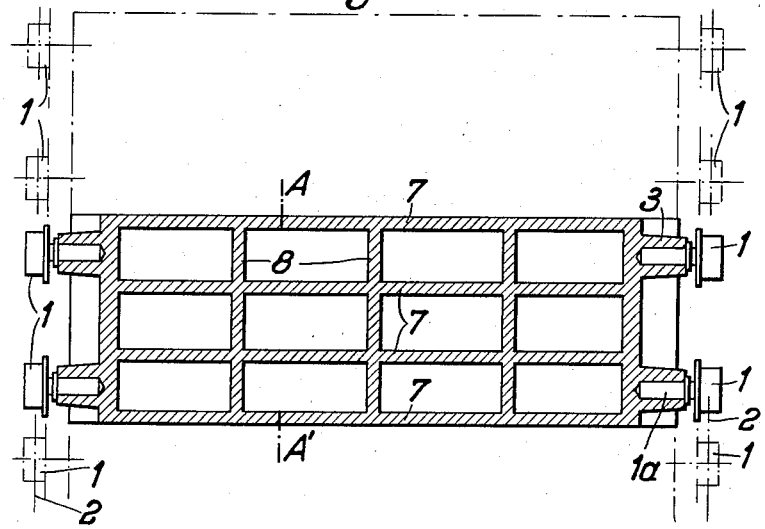
Figure 2 is a partial plan view of Figure 1.
Figures 3, 4:
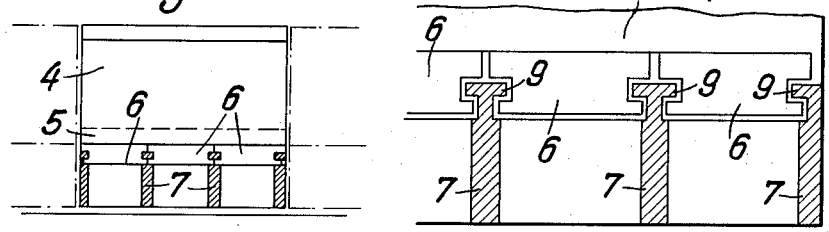
Figure 3 is a cross-sectional view on the line A—A' of Figure 2.
Figure 4 is an enlarged view of a portion of Figure 3.

Figures 1 to 4 represent the prior art in which the rollers 1 for the grate carriage ride on tracks 2 and support the carriage by means of axles 3. The carriage contains the material being sintered which appears as a layer 4 of pellets resting on a layer 5 of grate protecting inert material. Grate bars 6 carry layer 5 and the bars in turn are supported by the longitudinal grate members or beams 7 and the transverse beams 8.

Beams 7 have upwardly projecting T-shaped flanges 9 to which grate bars 6 are affixed. Beneath the carriage is the gas suction chamber 10. An air seal 11 is interposed between the upper edge of chamber 10 and a flange beneath axle 3.

Figures 5 to 8 show this invention as applied to the structure of Figures 1 to 4, respectively. The longitudinal beams 7 of Figure 1 are replaced by hollow beams 7a through which cooling air is passed. A similar mounting of the beams 8 is possible but not generally necessary. The cooling air is supplied by the same blowers which are used to create the suction in the suction chamber 10, and the heat taken up by the cooling air can be used as the preheated air applied to the sinter bed 5 during the burning process.

A special feature of the invention is the provision of the uniform heat expansion on both sides of the grate carriage by passing the cooling air in opposite directions through alternate beams 7a as shown by the arrows in Figure 6. Furthermore, combustion producing gases other than air can be used as the cooling medium passed through beams 7a. Liquids may also be used.

Figures 9 through 12 give an example and schematically explain in detail how the pallets are sealed by means of slide bars.

Recess 23 is envisaged on bottom surface 20 of pallet 21 with side walls 22 and grate bars 6 resting on supporting beams 7a. In recess 23 slide bar 11a is fitted. This slide bar 11a slides on another slide bar 11b rigidly connected to suction box frame 24 from which suction box 10 is suspended. An especially good sealing is obtained if the lower slide bar 11b and the upper slide bar 11a are made of coal or graphite and of metal, for instance steel, respectively.

In this case grease lubrication, which is conventionally used to effect sealing between the sintering machine pallets and the suction box, may be omitted.

It is advantageous that the weight of pallet 21 is not imposed on slide bars 11a and 11b, but is borne by rollers 1 arranged outside and running on rigid rails 2. To obtain sufficient sealing pressure in spite of it, slide bars 11a and 11b are pressed together by springs 25.

It is a further feature of this invention that the cooling air which serves for cooling the hollow supporting beams 7a, is removed through slide bars 11a and 11b. To attain this end, the lower slide bar 11b is provided with suitably spaced perforations. Underneath slide bar 11b there is outlet duct 26 with outlet tube 27 through which the heated cooling air is sucked off by means of fan 28. The upper slide bar 11a is provided with an oblong hole through which connecting pieces 30 is conducted.

The fresh air enters the hollow supporting beam 7a from the right-hand side and is sucked off by fan 28 via the upper connecting duct 29, via connecting pieces 30 passing through springs 25, via sliding bars 11a and 11b, via outlet duct 26 and via outlet tube 27.

Figure 9 shows a cross section where the cooling air is conducted from the right-hand to the left-hand side. In this case the right-hand half of the pallet has a lower temperature (approx. 20 degrees centrigrade) than the left-hand half which is passed by the heated cooling air that may have been heated up to as much as 200 degrees centigrade and above. To compensate the thus conditioned difference in the longitudinal extension of the two sides, the cooling air may be sucked alternatively from the right-hand to the left-hand side or vice versa either through the individual supporting beams 7a, through rigid rails 2. To obtain sufficient sealing pressure in spite of it, slide bars 11a and 11b are pressed together by springs 25.

It is a further feature of this invention that the cooling air which serves for cooling the hollow supporting beams 7a, is removed through slide bars 11a and 11b. To attain this end, the lower slide bar 11b is provided with suitably spaced perforations. Underneath slide bar 11b there is outlet duct 26 with outlet tube 27 through which the heated cooling air is sucked off by means of fan 28. The upper slide bar 11a is provided with an oblong hole through which connecting pieces 30 is conducted.

The fresh air enters the hollow supporting beam 7a from the right-hand side and is sucked off by fan 28 via the upper connecting duct 29, via connecting pieces 30 passing through springs 25, via sliding bars 11a and 11b, via outlet duct 26 and via outlet tube 27.

Figure 1 shows a cross section where the cooling air is conducted from the right-hand to the left-hand side. In this case the right-hand half of the pallet has a lower temperature (approx. 20 degrees centrigrade) than the left-hand half which is passed by the heated cooling air that may have been heated up to as much as 200 degrees centigrade and above. To compensate the thus conditioned difference in the longitudinal extension of the two sides, the cooling air may be sucked alternatively from the right-hand to the left-hand side or vice versa either through the individual supporting beams 7a, through groups of same or through the individual pallets.

The described sealing offers the advantage of preventing that, not even through the unavoidable small leakages occurring, for instance, at the contact points of the individual pallets or along the slide bars, false air can be sucked into suction box 10, because all and any false air that may have been sucked in, is removed through sealing duct 26 and tube 27. This is of particular advantage to such processes where it is intended to recirculate to the process the whole volume or part of the gas sucked off and where even slightest pollutions, such as oxygen, in the process gas are to be avoided.

Having now described the means by which the objects of the invention are obtained,

We claim:

1. A movable sintering bed apparatus comprising a carriage having grate bars, hollow carriage beams supporting said bars, said beams having imperforate surfaces and being open to cooling air at one end only, a gas suction chamber beneath said carriage, perforated lower slide bars mounted on the upper edges of said chamber, perforated upper slide bars communicating with and secured to said beams in alignment with and slidably bearing upon said lower slide bars for bringing the perforations of the upper and lower slide bars into communication for the passage of gas therethrough, and fan means joined to said lower slide bars on the side opposite the open end of said hollow carriage beams for drawing cooling air through said beams.

2. An apparatus as in claim 1, said slide bars being composed of a self-lubricating material.

3. An apparatus as in claim 2, further comprising wheels journaled upon said beams for supporting said carriage, and spring means mounted between said upper slide bars and said beams for urging said upper slide bars into engagement with said lower slide bars.

References Cited in the file of this patent

UNITED STATES PATENTS

| | | |
|---|---|---|
| 1,444,955 | Davis | Feb. 23, 1923 |
| 1,669,406 | Anderson | May 15, 1928 |
| 1,774,135 | Fassotte | Aug. 26, 1930 |
| 2,569,438 | Batik | Oct. 2, 1951 |
| 2,675,223 | Rolfsen | Apr. 13, 1954 |
| 2,853,289 | Schofield | Sept. 23, 1958 |
| 2,862,308 | Meredith et al. | Dec. 2, 1958 |